US010639796B2

United States Patent
Turner (10) Patent No.: US 10,639,796 B2
(45) Date of Patent: May 5, 2020

(54) VEHICLE E-COAT DRAIN PLUG INSERTION TOOL

(71) Applicant: FANUC AMERICA CORPORATION, Rochester Hills, MI (US)

(72) Inventor: Richard William Turner, Romeo, MI (US)

(73) Assignee: FANUC AMERICA CORPORATION, Rochester Hills, MI (US)

( * ) Notice: Subject to any disclaimer, the term of this patent is extended or adjusted under 35 U.S.C. 154(b) by 63 days.

(21) Appl. No.: 15/802,643

(22) Filed: Nov. 3, 2017

(65) Prior Publication Data

US 2019/0134817 A1 May 9, 2019

(51) Int. Cl.
*B25J 9/16* (2006.01)
*B25J 19/02* (2006.01)
(Continued)

(52) U.S. Cl.
CPC ............. *B25J 9/1687* (2013.01); *B23P 19/02* (2013.01); *B25J 13/08* (2013.01); *B25J 15/0019* (2013.01); *B25J 15/0441* (2013.01); *B25J 15/0491* (2013.01); *B25J 19/023* (2013.01); *B62D 65/02* (2013.01); *B25J 11/007* (2013.01); *B25J 15/0608* (2013.01); *B62D 25/24* (2013.01); *Y10T 29/4978* (2015.01);
(Continued)

(58) Field of Classification Search
CPC .. B25J 15/0019; B25J 9/1687; B25J 15/0491; B25J 15/0441; B25J 19/023; B25J 11/007; B25J 13/08; B25J 15/0608; B25J 15/00; B62D 65/02; Y10T 29/49778; Y10T 29/4978; Y10T 29/53478; Y10T 29/53483
See application file for complete search history.

(56) References Cited

U.S. PATENT DOCUMENTS

| 4,700,981 A | * | 10/1987 | Seyler | .................... B21D 39/20 156/295 |
| 4,817,262 A | * | 4/1989 | Seyler | .................... B21D 39/20 29/458 |

(Continued)

FOREIGN PATENT DOCUMENTS

DE   202015102826 U1   9/2016
WO      2005051609 A2   6/2005

*Primary Examiner* — Jermie E Cozart
(74) *Attorney, Agent, or Firm* — John A. Miller; Shumaker, Loop & Kendrick, LLP (57) ABSTRACT

Methods and systems for installing a plug into an aperture of an article are provided, such as drain hole in an electrocoated vehicle floor pan. A robot system used herein includes a robot and a tool, where the tool includes a plug reservoir, a sensor, and an actuator. The sensor is configured to detect the aperture of the article and the actuator is configured to place one of the plugs from the plug reservoir into the aperture. The robot system can include a tool change nest, where the plug reservoir can be received with the tool change nest and the removed from a remainder of the tool. Quick change of plug reservoirs using the present technology improves operation speed and use of one or more tool change nests can reload and/or reconfigure the robot system for plugging various apertures with minimized input or interaction.

19 Claims, 4 Drawing Sheets

(51) Int. Cl.
*B62D 65/02* (2006.01)
*B25J 15/04* (2006.01)
*B25J 15/00* (2006.01)
*B25J 13/08* (2006.01)
*B25J 11/00* (2006.01)
*B25J 15/06* (2006.01)
*B23P 19/02* (2006.01)
*B62D 25/24* (2006.01)

(52) U.S. Cl.
CPC .... *Y10T 29/49778* (2015.01); *Y10T 29/53478* (2015.01); *Y10T 29/53483* (2015.01)

(56) References Cited

U.S. PATENT DOCUMENTS

| | | | |
|---|---|---|---|
| 5,608,847 A * | 3/1997 | Pryor | A01B 69/008 |
| | | | 700/248 |
| 5,715,660 A * | 2/1998 | Balentine | B65B 43/52 |
| | | | 53/251 |
| 6,135,291 A | 10/2000 | Canella | |
| 6,290,279 B1 | 9/2001 | Haight et al. | |
| 6,948,227 B2 | 9/2005 | Kilibarda et al. | |
| 2006/0167587 A1 | 7/2006 | Read | |
| 2011/0182708 A1 | 7/2011 | Baudisch et al. | |
| 2011/0209320 A1 | 9/2011 | Connolly | |
| 2014/0107953 A1 | 4/2014 | Mueller et al. | |
| 2014/0174028 A1 | 6/2014 | Yamagata et al. | |
| 2015/0166208 A1 | 6/2015 | Miyauchi | |
| 2016/0052134 A1 | 2/2016 | Kossmann et al. | |
| 2018/0021953 A1 | 1/2018 | Kossmann et al. | |

* cited by examiner

VEHICLE E-COAT DRAIN PLUG INSERTION TOOL

FIELD

The present technology relates to an apparatus for inserting a plug into an aperture within an electrocoated article, including a robot fitted with the apparatus.

INTRODUCTION

This section provides background information related to the present disclosure which is not necessarily prior art.

Coating of electrically conductive substrates by an electrodeposition process, also called an electrocoating or e-coat process, is a well-known and important industrial method. For example, electrodeposition of a coating or primer on an electrically conductive article is a widely used process in the automotive industry for coating vehicle parts and bodies. In this process, for example, a metal vehicle body can be partially or entirely immersed in a bath of an aqueous emulsion of film forming polymer with the conductive vehicle body acting as an electrode in the electrodeposition process. An electric current is passed between the vehicle body and a counter-electrode in electrical contact with the coating composition until a coating having the desired properties is deposited on the vehicle body. In a cathodic electrodeposition process, the article to be coated is configured as the cathode and the counter-electrode is configured as the anode. After the electrodeposition process is complete, the resulting coated article is removed from the bath, rinsed (e.g., with deionized water), and cured typically in an oven at sufficient temperature to form a cross-linked finish on the article. Once the electrodeposition coating is applied, the article may be top coated with one or more layers of automotive exterior finish to provide chip resistance properties and an attractive and aesthetic appearance, such as gloss and distinctness of image.

One issue with the electrodeposition process is the ability to drain the article (e.g., vehicle body) following immersion and coating in the electrodeposition bath. Excess bath liquid can be drained from cavities, recesses, and partially enclosed portions of a vehicle body through the use of strategically placed apertures or drain holes in the vehicle body. Once the electrodeposition bath liquid is drained, the vehicle body can be heated to cure the film forming polymer and the apertures or drain holes can be closed by insertion of plugs or stoppers formed of various materials. In certain cases, these apertures need to be plugged to prevent water, dust, or air intrusion into the passenger compartment of the finished vehicle. Various vehicle floor pan configurations may include a dozen or more apertures that subsequently need to be plugged.

Such plugs can be inserted manually or by using a tool as a vehicle body moves through a processing line. However, safety hazards must be avoided when an operator is required to reach inside a moving vehicle body to insert one or more plugs. This includes the movement involved in opening/closing vehicle doors and hatches and/or further assembly of the vehicle and related components. Plug insertion can require accounting for sharp metal edges when reaching inside the vehicle, ergonomic concerns where physical strength and awkward positions may be required to insert the plug, and repetitive motion issues that can affect the operator.

Accordingly, there is a need to optimize the installation of plugs into apertures or drain holes of an electrocoated article, such as a vehicle body.

SUMMARY

The present technology includes articles of manufacture, systems, and processes that relate to the insertion of one or more drain plugs into one or more apertures within an article, such as an electrocoated article.

In certain embodiments, a tool for installing a plug into an aperture of an article is provided, where the tool is configured to be coupled to a robot. The tool includes a plug reservoir, a sensor, and an actuator. The plug reservoir is configured to hold a plurality of plugs. The sensor is configured to detect the aperture of the article and can be configured to position the tool with respect to the aperture. The actuator is configured to place one of the plugs from the plug reservoir into the aperture of the article.

In various embodiments, a robot system for installing a plug into an aperture of an article is provided. The robot system includes a robot and a tool as described herein. The robot system can further include a tool change nest, where the plug reservoir can be reversibly coupled to the tool and the plug reservoir can be configured to be reversibly received by the tool change nest. The plug reservoir can be configured to be decoupled from the tool and remain received by the tool change nest. The system can include more than one tool change nest.

In some embodiments, a method of installing a plug into an aperture of an article, is provided. The method includes using a robot system as described herein. The aperture of the article is located. One of the plugs from the plug reservoir is placed into the aperture of the article using the actuator. The sensor can comprise an image sensor that is configured to differentiate between an unplugged aperture and a plugged aperture. The method can further include determining whether the aperture is one of an unplugged aperture and a plugged aperture and placing another one of the plugs from the plug reservoir into the aperture of the article using the actuator if the aperture is an unplugged aperture. The robot system can further include a tool change nest, where the plug reservoir is receivable by the tool change nest, and the plug reservoir is reversibly coupled to the tool and reversibly received by the tool change nest. In this way, the method can further include receiving the plug reservoir with the tool change nest and decoupling the plug reservoir from the tool, where the plug reservoir remains received by the tool change nest. The method can further include replacing the plug reservoir with another plug reservoir. Replacing the plug reservoir with another plug reservoir can also be performed at least in part by the robot. The method can also include locating another aperture of the article using the sensor and placing another one of the plugs from the plug reservoir into the another aperture of the article using the actuator.

In certain embodiments, a method of configuring a tool for installing a plug into an aperture of an article is provided. The method includes providing a robot system as described herein. The plug reservoir is received with the tool change nest and the plug reservoir is removed from the tool. The method can further include coupling another plug reservoir to the tool, where the another plug reservoir can be received by another tool change nest. The another plug reservoir can be removed from the another tool change nest, where the another plug reservoir includes a plurality of plugs. As such, the aperture of the article can be located and one of the plugs from the another plug reservoir can be placed into the aperture of the article using the actuator.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

The present technology provides means for installing a plug into an aperture of an article, such as a vehicle body subjected to electrocoating. Various aspects of an aperture within an article can be accommodated when installing one or more plugs, including different sizes, shapes, numbers, and locations of such apertures. Likewise, various sizes, shapes, numbers, and material types of plugs can be accommodated. The tools, robot systems, and methods provided herein can therefore optimize the installation of plugs into apertures or drain holes of an electrocoated article, such as a vehicle body, as it is subjected to coating, processing, and/or assembly.

In some embodiments, a tool for installing a plug into an aperture of an article is provided, where the tool is configured to be coupled to a robot. A robot system can also be provided including the tool and a robot. The tool can include a plug reservoir, a sensor, and an actuator. The plug reservoir can be configured to hold a plurality of plugs. The sensor can be configured to detect the aperture of the article and can serve to position the tool with respect to the aperture in conjunction with the robot. The actuator can be configured to place one of the plugs from the plug reservoir into the aperture of the article. The tool can also include an interface configured to allow a robot controller of the robot to operate the tool. The robot can include a robotic arm, including a multi-axis robotic arm, such as a six-axis robotic arm. The tool can be coupled to a distal end of the robotic arm. The robot system can also include a tool change nest, where the plug reservoir can be reversibly coupled to the tool and the plug reservoir can be configured to be reversibly received by the tool change nest.

The plug reservoir can include the following aspects. Anywhere from a single plug to multiple plugs can be contained or held within the plug reservoir depending on the configuration thereof. For example, the plug reservoir can be configured as a cartridge having a series of plugs contained therein, where the plugs are pre-arranged in an ordered register for dispensing or placing into one or more apertures. The ordered register can include plugs of various sizes, shapes, materials, etc. in a particular order or all the plugs can be of the same size, shape, material, etc. Where one or more of the plugs are different, the plugs can therefore be installed in a desired sequence into their complementary or selected apertures. Configuring the plug reservoir as a cartridge can coincide with the plug reservoir being detachable or replaceable, allowing quick changeout of an empty plug reservoir with a pre-filled plug reservoir. The plug reservoir can also be refilled with the same or different plugs. Different plug reservoirs can also be used to accommodate different plug sizes, shapes, materials, etc. For example, certain plug reservoirs can be configured with certain plug types, where the tool can hence be reconfigured for certain apertures by simply changing out the plug reservoir. The plug reservoir can include various retaining means to hold or position one or more plugs therein. One or more resilient members, such as spring detents, can hold one or more plugs in position for dispensing until an installation operation is ready. Other configurations of the plug reservoir can include a hopper designed to hold a bulk quantity of plugs as well as an automatic feeding device that can continuously provide or feed plugs on demand to the tool. The tool can include a counter configured to ascertain a number of plugs in the plug reservoir, for example, either by counting a number of plugs already installed and/or by sensing a number of plugs remaining in the plug reservoir.

The sensor can include the following aspects. The sensor can detect the aperture of the article in various ways, including a touch sensor that physically locates the aperture and/or a boundary of the aperture, an acoustic sensor, a photosensor (e.g., a laser sensor), and an image sensor. Once the aperture is located, the sensor can position the tool with respect to the aperture or the tool can be further moved to position the tool with respect to the aperture by using the robot, for example. Where the sensor includes an image sensor, the sensor can be configured to differentiate between an unplugged aperture and a plugged aperture. This feature can allow the tool to automatically discriminate between a completed or successful plug installation and an unplugged aperture. An example includes where the sensor is an iR 3DL vision sensor that can differentiate between an unplugged aperture and a plugged aperture. The tool can also include a light that is configured to operate with the image sensor. The light source can of course be matched to the sensor; e.g., an infrared light source for an infrared image sensor, visible light for semiconductor charge-coupled devices (CCD) or active pixel sensors in complementary metal-oxide-semiconductor (CMOS), etc.

The actuator can include the following aspects. Various types of actuators can be employed, including electric, hydraulic, and pneumatic actuators. The tool can further include a fluid reservoir where the actuator is a hydraulic actuator or a pneumatic actuator. Alternatively, the tool can be fluidly coupled to a hydraulic fluid source or a pressurized gas source, depending on the actuator type. A replaceable air reservoir of pressurized air, or an air reservoir coupled to an air pump, can be included along with the pneumatic actuator. The actuator can include a piston configured to drive a single plug into place within a selected aperture. The actuator can also be configured to operate on a stack or array of plugs to thereby drive a distal plug of the stack or array of plugs into place within a selected aperture.

The tool change nest can include the following aspects. The tool change nest can be positioned within reach of the robot so that the robot can move the tool to the tool change nest. In this manner, the plug reservoir can be reversibly received by the tool change nest. Where the plug reservoir is reversibly coupled to the tool, the plug receiver can be decoupled from the tool and remain received by tool change nest. For example, the plug reservoir can be reversibly coupled to the tool by various coupling means, including various fasteners, clamps, and/or pins that employ a mechanical force and/or a magnetic force. Reversible coupling can be achieved by one or more permanent magnets where the robot arm can move the tool with respect to the plug reservoir as it is received by the tool change nest. For example, the plug reservoir can be received by the tool change nest in a manner that prevents rotation of the plug reservoir, where the robot then rotates all or part of a remainder of the tool and displaces the one or more permanent magnets or associated ferromagnetic materials to thereby separate the plug reservoir from the tool. Alternatively, the magnetic force can be supplied by electromagnets and reversible coupling can be achieved by controlling electric current thereto. Such magnet arrangements can be combined with various alignment pins that orient the tool change nest and/or facilitate coupling and retention of one of the plug reservoir and the tool change nest to the other of the plug reservoir and the tool change nest. Likewise, the tool change nest can be reversibly coupled to the remainder of the tool in this fashion.

Using the tool change nest, the tool or a portion of the tool (e.g., the plug reservoir) can be parked or stored at the tool change nest. A tool without a plug reservoir can also be moved to a tool change nest that is holding or receiving a plug reservoir. For example, the robot can leave a first plug reservoir from the tool at a first tool change nest and pick up a second plug reservoir at a second tool change nest. Plug reservoirs containing different types and/or numbers of plugs can be exchanged with the tool in this fashion. The plug reservoir can be received by a recess or aperture of the tool change nest, where the plug reservoir can be reversibly coupled to the tool and can be reversibly received by the tool change nest. The recess or aperture of the tool change nest can be configured to grip the plug reservoir or hold the plug reservoir in a particular orientation. The tool change nest, for example, can operate as a universal coupler for coupling of various plug reservoirs, allowing exchange of empty plug reservoirs for filled or refilled plug reservoirs and/or exchange between plug reservoirs loaded with different types of plugs. The plug reservoir can be reversibly received by the tool change nest in a way that can index or orient the plug reservoir with respect to the tool for coupling thereto.

In various embodiments, a method of installing a plug into an aperture of an article is provided. The various robot systems including the robots and tools as described herein can be employed. The tool can have a plug reservoir including one or more plugs. The method can include locating the aperture of the article and placing one of the plugs from the plug reservoir into the aperture of the article using the actuator. Where the sensor of the tool includes an image sensor, the image sensor can be configured to differentiate between an unplugged aperture and a plugged aperture. Accordingly, the method can include determining whether the aperture is one of an unplugged aperture and a plugged aperture. Another one of the plugs from the plug reservoir can be placed into the aperture of the article using the actuator when the aperture is an unplugged aperture. For example, the robot system can double check the effectiveness of a prior plug placement into the aperture, whether the prior plug placement was effected by the robot used in the robot system or by another robot or operator. Error proofing various plug operations can therefore be part of the process. The method can also include locating another aperture of the article and placing another one of the plugs from the plug reservoir into the another aperture of the article using the actuator. A plurality of apertures in one or more articles can be plugged in this fashion. Where the robot system further includes a tool change nest, the plug reservoir can be receivable by the tool change nest, and the plug reservoir can be reversibly coupled to the tool and reversibly received by the tool change nest. This allows the plug reservoir to be received with the tool change nest and decoupled from the tool, where the plug reservoir can therefore remain received and held by the tool change nest. Another plug reservoir can subsequently be coupled to the tool.

In certain embodiments, a method of configuring a tool for installing a plug into an aperture of an article is provided. The various robot systems including the robots, tools, and tool change nests as described herein can be employed. The plug reservoir of the tool can be received with the tool change nest. The plug reservoir can then be removed from the tool. Another plug reservoir can then be coupled to the tool. For example, the another plug reservoir can be held or received in another tool change nest, where the robot moves the tool to acquire the another plug reservoir. The another plug reservoir can therefore be removed from the another tool change nest, where the another plug reservoir includes a plurality of plugs. In this way, the tool can be reloaded with a new plug reservoir full of plugs or can be outfitted with a new plug reservoir with a different type of plug; e.g., different size, shape, material, etc. The method can further include locating the aperture of the article and placing one of the plugs from the another plug reservoir into the aperture of the article using the actuator.

The present technology provides various benefits and advantages. For example, automation of installing plugs into apertures of articles does not require vehicle doors and hatches to be manually opened or accessed, as the robot can reach through door windows or windshield or back light openings for the process. Potential safety hazards to human operators are minimized and ergonomic design considerations for human operators are removed. The modular design of the plug reservoir and interchange and reloading thereof can standardize plug cartridges and plug dispensing configurations, which can further allow multiple plug types, materials, and sizes to be used with the same tool and methods. Quick change of plug reservoirs can improve operation speed and multiple tool change nests can reload and/or reconfigure the robot system for plugging various apertures with minimized human operator input or interaction. This can further reduce maintenance down time. The tools, systems, and methods provided are compatible with typical electrocoated articles, such as a vehicle bodies, and the processing thereof, and can be incorporated into existing coating and paint processing lines and hardware. Standard robot logic can be used to control the tools, systems, and methods. In this way, the present technology can optimize the plugging of one or more apertures to prevent water, dust, or air intrusion into the passenger compartment of a finished vehicle.

EXAMPLE

Figure 1:
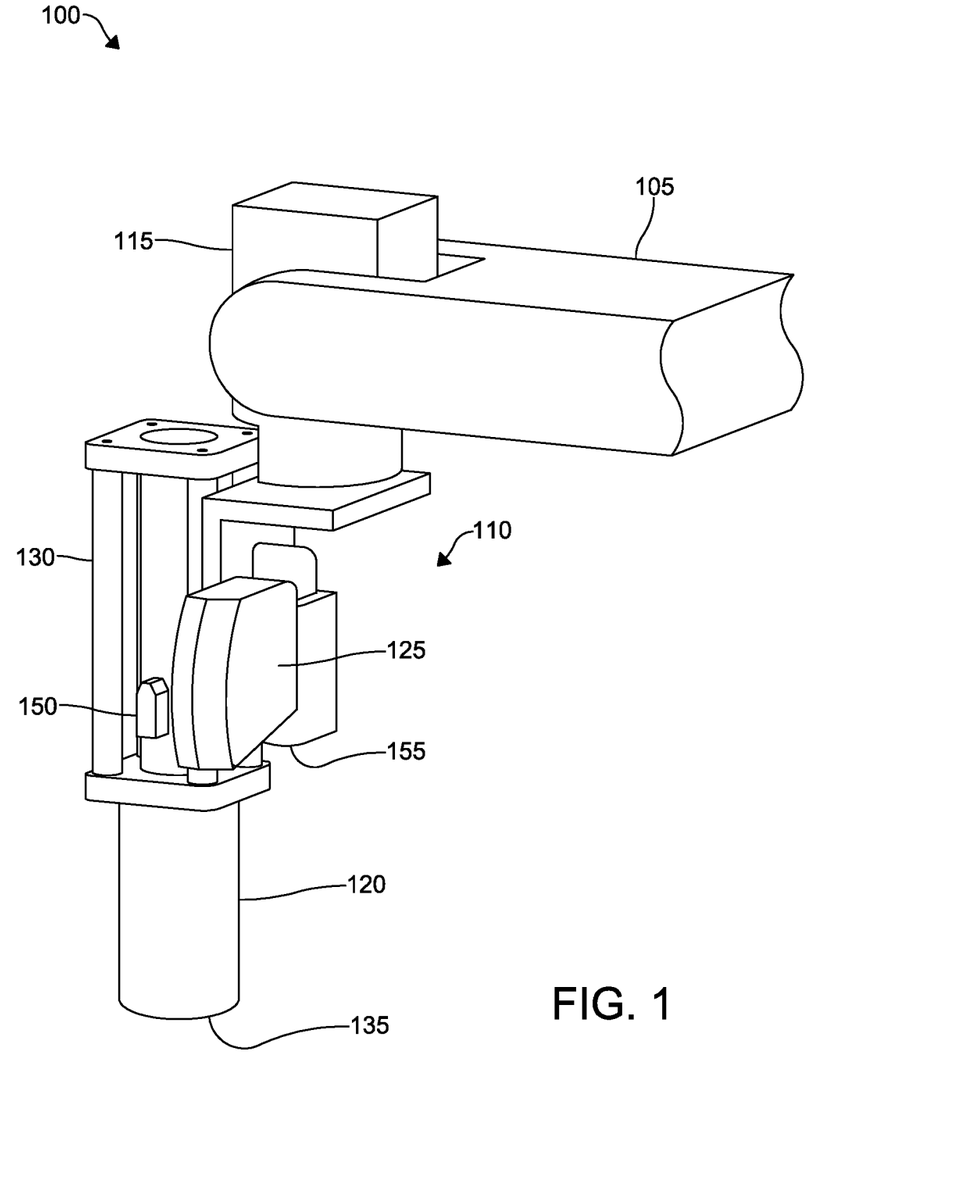
FIG. 1 is a perspective view of an embodiment of a robot system including a robot and tool according to the present technology.
Figure 2:
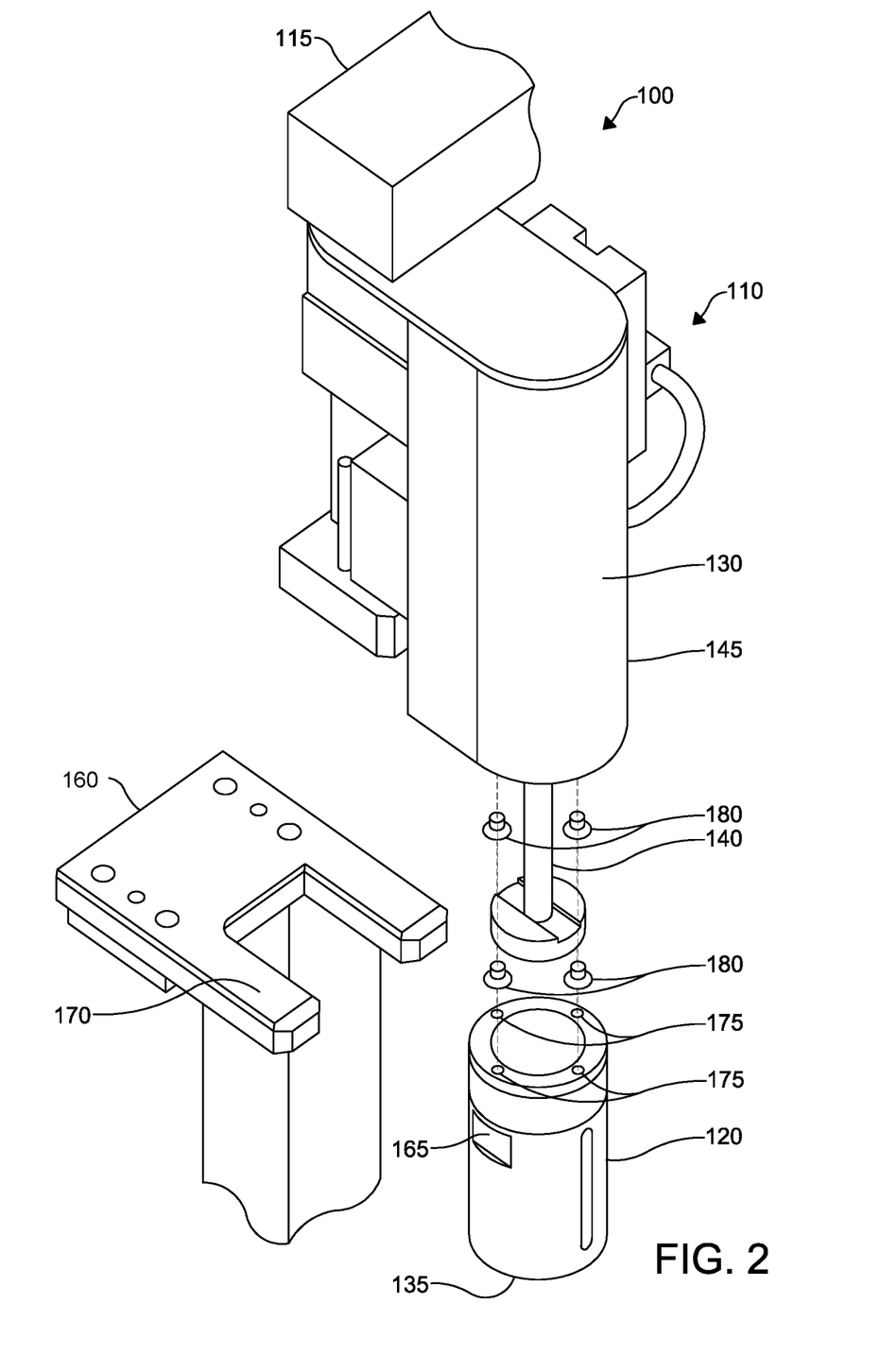
FIG. 2 is a perspective view of the robot system further including a tool change nest and showing an extended actuator piston and an exploded view of the coupling between a first plug reservoir and the actuator of the tool.
Figure 3:
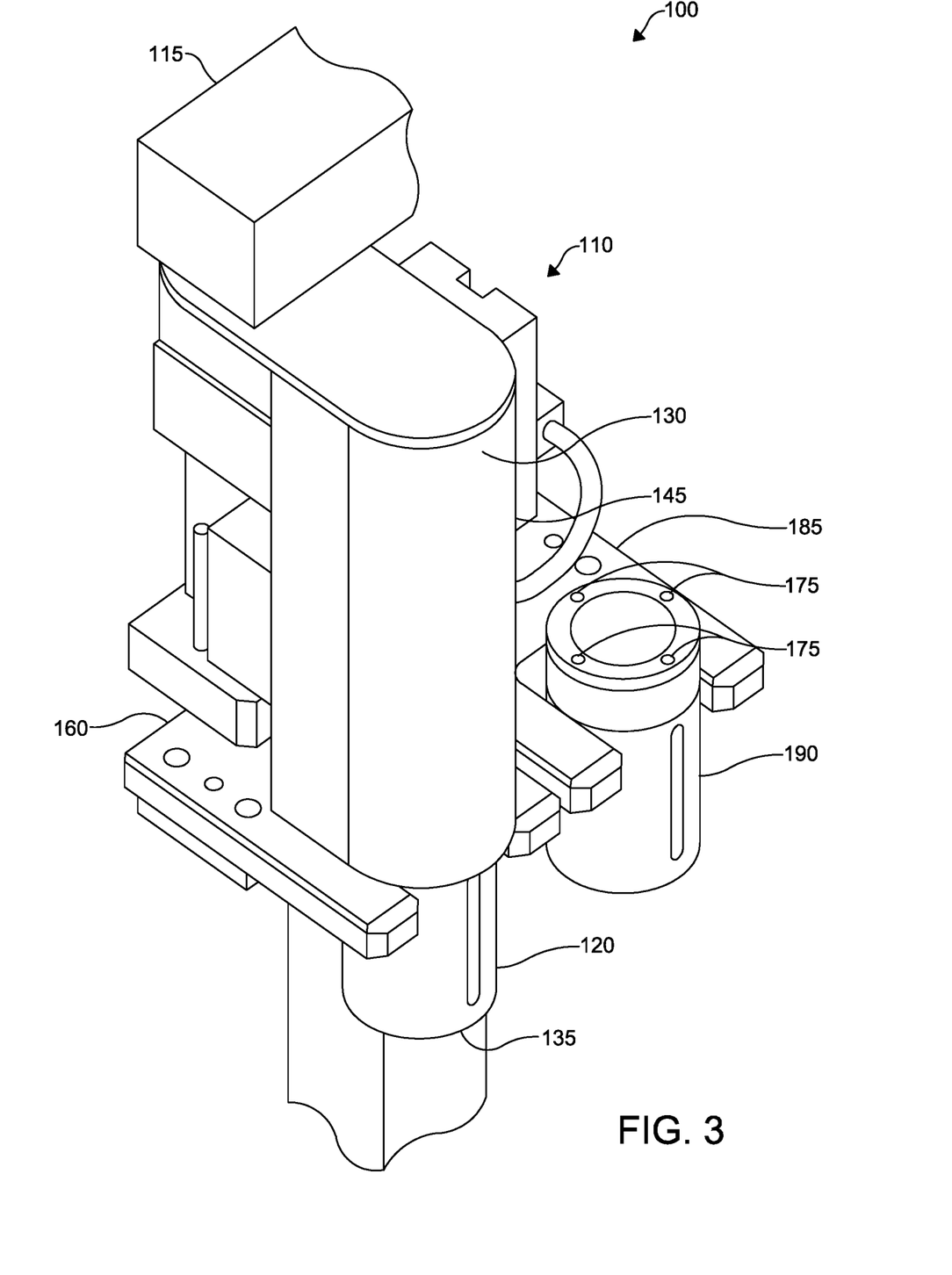
FIG. 3 is a perspective view of the robot system where a first plug reservoir coupled to the tool is received by a first tool change nest and a second plug reservoir is received by a second tool change nest.
Figure 4:
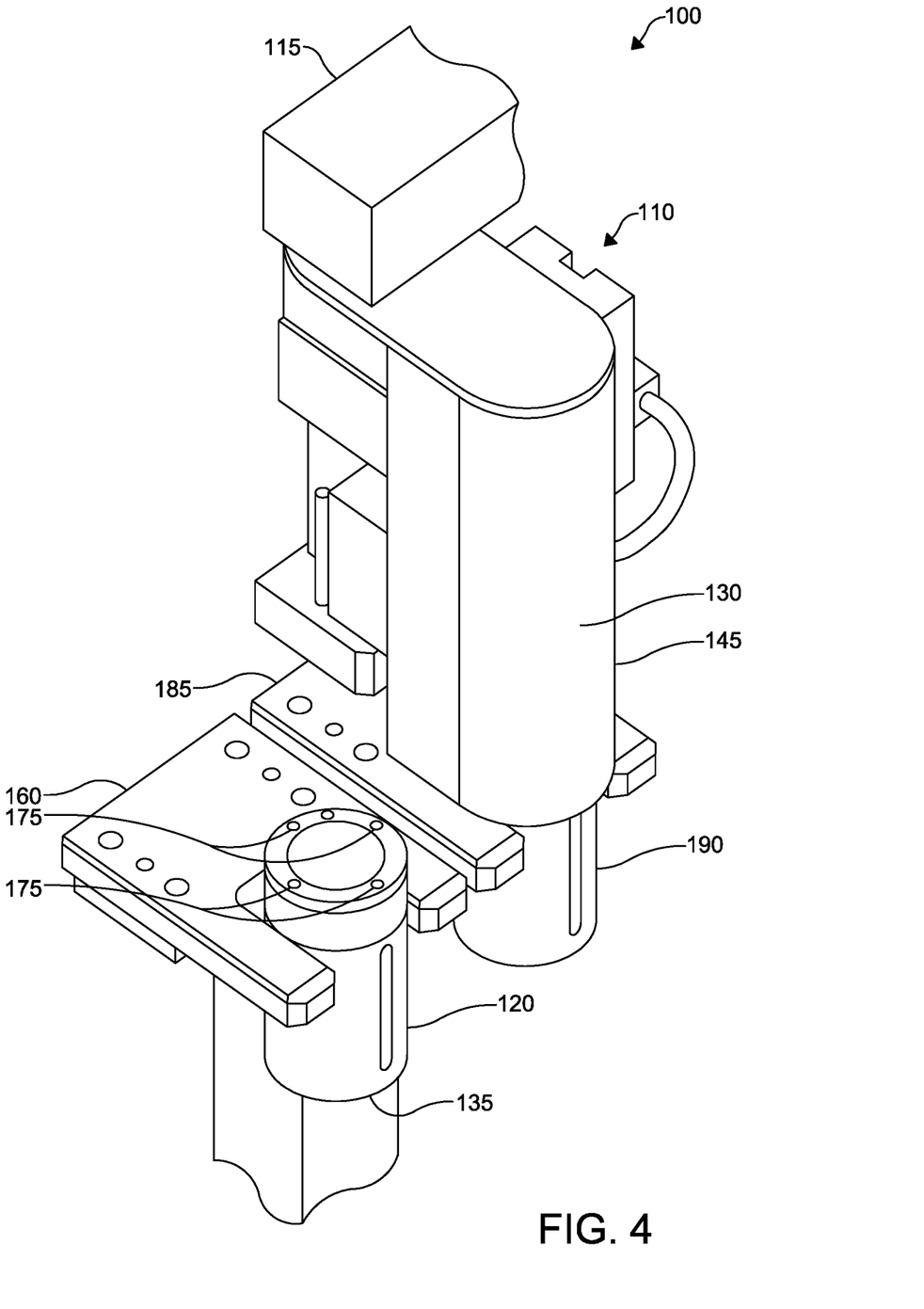
FIG. 4 is a perspective view of the robot system decoupled from the first plug reservoir in the first tool change nest and coupled to the second plug reservoir in the second tool change nest.

With reference to the figures, an embodiment of a robot system 100 according to the present technology is shown. The robot system 100 includes a robot 105 and a tool 110. Only the distal end of a robotic arm of the robot 105 is shown, which includes an articulated axis coupling 115 to the tool 110. The robot 105 can include additional axes of articulation and can be configured with a six axis robotic arm. The tool 110 includes a first plug reservoir 120, a sensor 125, and an actuator 130. The first plug reservoir 120 is configured as a cartridge tube and can hold a plurality of plugs stacked atop each other and inline along a longitudinal axis of the tube. The sensor 125 is configured to detect the aperture of the article to be plugged (not shown) and can be used in conjunction with the robot 105 to optimize the placement of the distal end 135 of the first plug reservoir 120 with respect to the aperture. The actuator 130 is configured to place one of the plugs from the first plug reservoir 120 into the aperture. As shown, the actuator 130 is a pneumatic actuator including a piston 140 that extends at least partially into the first plug reservoir 120 to drive a plug out the distal end 135 of the first plug reservoir 120. FIG. 1 shows the actuator 130 without a shroud 145, where FIGS. 2, 3, and 4 show the actuator 130 covered with the shroud 145. A counter 150 is included as part of the actuator 130 and is configured to ascertain a number of plugs in the first plug reservoir 120, either by counting a number of plugs already installed by the actuator 130 and/or by using the actuator 130 to sense a number of plugs remaining in the first plug reservoir 120. The counter 150 can also be positioned with respect to other portions of the tool 110 and can operate as a position sensor to ascertain whether enough plugs are available in the first plug reservoir 120 for a plug installation cycle using the robot system 100, for example.

The sensor 125 is configured as an image sensor that can differentiate between an unplugged aperture and a plugged aperture. In this manner, the robot system 100 can determine whether a plugging operation was successful and can error proof various plug operations. Where the plugging operation was unsuccessful or incomplete and/or where the sensor 125 identifies an unplugged aperture, the robot system 100 can place a plug into the unplugged aperture. The tool 100 includes a light 155 configured to operate with the image sensor 125 to differentiate between an unplugged aperture and a plugged aperture.

With reference now to FIGS. 2, 3, and 4, the tool system 100 is shown with a first tool change nest 160. The first plug reservoir 120 is reversibly coupled to the tool 110 and the first plug reservoir 120 is also configured to be reversibly received by the first tool change nest 160. The robot 105 can move the tool 110 to the first tool change nest 160 where the first plug reservoir 120 is received and held in a fixed orientation by at least one cutout 165 on the first plug reservoir that cooperates with a forked portion 170 of the first tool change nest 160 as the first plug reservoir 120 is received by the first tool change nest 160 in a horizontal direction. In this way, the first plug reservoir 120 cannot rotate within or slide in a vertical direction out of the first tool change nest 160. This allows the first plug reservoir 120 to be decoupled from the tool 100 and remain received by the first tool change nest 160. The first plug reservoir 120 is reversibly coupled to the tool 110 by a magnetic force, where the first plug reservoir 120 includes magnets 175 that interact with ferrous screws 180 coupled to the actuator 130 of the tool 110. In this way, the robot 105 can rotate the tool 110 while the first plug reservoir 120 is received by the first tool change nest 160 and displace the magnets 175 so that they no longer interact with the ferrous screws 180 coupled to the actuator 130. This allows the first plug reservoir 120 to be separated from a remainder of the tool 110 and remain received by the first tool change nest 160. Although not shown, the first plug reservoir 120 can also be reversibly coupled to the tool 110 using various coupling means, including various fasteners, clamps, and/or pins that employ a mechanical force alone or in conjunction with the magnetic force.

With respect to FIGS. 3 and 4, the robot system 100 is shown with a second tool change nest 185 and a second plug reservoir 190. In FIG. 3, the robot 105 has positioned the first plug reservoir 120 so that it is received by the first tool change nest 160. The first plug reservoir 120 can then be removed from the tool 110. The second plug reservoir 190 located in the second tool change nest 185 can then be coupled to the tool, where the robot 105 moves the tool 110 sans the first plug reservoir 120 over to the second tool change nest 185, as shown in FIG. 4. The second plug reservoir 190 being held or received in the second tool change nest 185 can be loaded with a plurality of plugs, allowing the tool 110 to be reloaded and continue with a plugging operation. The second plug reservoir 190 can include the same type or a different type of plug from the first plug reservoir 120; e.g., different size, shape, material, etc. The robot system 100 can then locate one or more apertures of the article and continue placing plugs from the second plug reservoir 190 into the apertures of the article using the actuator 130.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A robot system for installing a plug into an aperture of an article, the robot system comprising:
   a robot; and
   a tool including:
   a plug reservoir reversibly coupled to the tool and configured to hold a plurality of plugs;
   a sensor configured to detect the aperture of the article; and
   an actuator configured to place one of the plugs from the plug reservoir into the aperture.

2. The robot system of claim 1, further comprising a counter configured to ascertain a number of plugs in the plug reservoir.

3. The robot system of claim 1, wherein the sensor comprises an image sensor.

4. The robot system of claim 3, wherein the image sensor is configured to differentiate between an unplugged aperture and a plugged aperture.

5. The robot system of claim 3, further comprising a light configured to operate with the image sensor to differentiate between an unplugged aperture and a plugged aperture.

6. The robot system of claim 1, wherein the actuator comprises a pneumatic actuator.

7. The robot system of claim 1, further comprising a tool change nest, wherein the plug reservoir is configured to be reversibly received by the tool change nest.

8. The robot system of claim 7, wherein the plug reservoir is configured to be decoupled from the tool and remain received by the tool change nest.

9. The robot system of claim 7, wherein the plug reservoir is reversibly coupled to the tool by a magnetic force.

10. A method of installing a plug into an aperture of an article, the method comprising:
    providing a robot system comprising:
    a robot; and
    a tool including:
    a plug reservoir reversibly coupled to the tool and including a plurality of plugs;
    a sensor configured to detect the aperture of the article; and
    an actuator configured to place one of the plugs from the plug reservoir into the aperture of the article;
    locating the aperture of the article; and
    placing one of the plugs from the plug reservoir into the aperture of the article using the actuator.

11. The method of claim 10, wherein the sensor comprises an image sensor and the image sensor is configured to differentiate between an unplugged aperture and a plugged aperture, the method further comprising:
    determining whether the aperture is one of an unplugged aperture and a plugged aperture; and
    placing another one of the plugs from the plug reservoir into the aperture of the article using the actuator when the aperture is an unplugged aperture.

12. The method of claim 10, further comprising:
    locating another aperture of the article; and
    placing another one of the plugs from the plug reservoir into the another aperture of the article using the actuator.

13. The method of claim 10, wherein the robot system further comprises a tool change nest, and the plug reservoir is reversibly receivable by the tool change nest, the method further comprising:
    receiving the plug reservoir with the tool change nest; and
    decoupling the plug reservoir from the tool, wherein the plug reservoir remains received by the tool change nest.

14. The method of claim 13, further comprising coupling another plug reservoir to the tool.

15. A method of configuring a tool for installing a plug into an aperture of an article, the method comprising:
    providing a robot system comprising:
    a robot;
    a tool including:
    a plug reservoir;
    a sensor configured to detect the aperture of the article; and
    an actuator configured to place one of the plugs from the plug reservoir into the aperture of the article; and
    a tool change nest;
    receiving the plug reservoir with the tool change nest; and
    removing the plug reservoir from the tool.

16. The method of claim 15, further comprising coupling another plug reservoir to the tool.

17. The method of claim 16, wherein the another plug reservoir is received by another tool change nest.

18. The method of claim 17, further comprising removing the another plug reservoir from the another tool change nest, wherein the another plug reservoir includes a plurality of plugs.

19. The method of claim 18, further comprising:
    locating the aperture of the article; and
    placing one of the plugs from the another plug reservoir into the aperture of the article using the actuator.

* * * * *